US009726233B2

(12) United States Patent
Margraf et al.

(10) Patent No.: US 9,726,233 B2
(45) Date of Patent: Aug. 8, 2017

(54) HYDRAULIC SYSTEM FOR AN AUTOMATIC TRANSMISSION

(71) Applicant: ZF Friedrichshafen AG, Friedrichshafen (DE)

(72) Inventors: Christoph Margraf, Markdorf (DE); Stefan Brom, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 14/970,719

(22) Filed: Dec. 16, 2015

(65) Prior Publication Data

US 2016/0178018 A1    Jun. 23, 2016

(30) Foreign Application Priority Data

Dec. 17, 2014  (DE) .................. 10 2014 226 150

(51) Int. Cl.
*F16D 25/0638*    (2006.01)
*F16D 25/06*    (2006.01)
(Continued)

(52) U.S. Cl.
CPC .............. *F16D 25/14* (2013.01); *F15B 15/26* (2013.01); *F16D 25/0638* (2013.01); *F15B 15/261* (2013.01)

(58) Field of Classification Search
CPC ......................... F16D 25/0638; F16D 25/06
See application file for complete search history.

(56) References Cited

U.S. PATENT DOCUMENTS 3,950,959 A    4/1976  Coureau
6,767,302 B2 *  7/2004  Seungpyo ............. F16H 7/0848
                                                    474/101

(Continued)

FOREIGN PATENT DOCUMENTS

DE    2308642 A1    8/1973
DE    10205411 A1   8/2003
(Continued)

OTHER PUBLICATIONS

German Patent Office Search Report, dated Oct. 7, 2015.

*Primary Examiner* — Jacob S Scott
*Assistant Examiner* — Tinh Dang
(74) *Attorney, Agent, or Firm* — Dority & Manning, P.A.

(57) ABSTRACT

A hydraulic system for operating an automatic transmission for motor vehicles includes a hydraulic actuator for operating a clutch and a stop valve, whereas the actuator has a pressurizable actuating pressure chamber, which can be closed in a pressure-tight manner by means of the stop valve, such that the clutch pressure is maintained independent of the other pressures of the hydraulic system. The stop valve includes a closure device that is movable by means of a hydraulic control pressure (p_S) into a closed position, in which an actuating pressure chamber port, and thus the actuating pressure chamber, is closed by means of the closure device. The closure device is movable into an open position at least by means of the force of a spring, in which the actuating pressure chamber port is opened. Thereby, the stop valve features a shiftable locking device, by means of which the closure device can be fixed in the closed position.

16 Claims, 5 Drawing Sheets

(51) Int. Cl.
*F15B 15/26* (2006.01)
*F16D 48/02* (2006.01)

(56) References Cited

U.S. PATENT DOCUMENTS

| | | | |
|---|---|---|---|
| 6,948,524 B1* | 9/2005 | Sowul | F16D 48/04 |
| | | | 137/596 |
| 8,813,709 B2 | 8/2014 | Boegershausen | |
| 9,249,843 B2* | 2/2016 | Ari | F16D 25/12 |
| 2015/0141189 A1* | 5/2015 | Nakano | F16D 23/12 |
| | | | 475/116 |

FOREIGN PATENT DOCUMENTS

| | | |
|---|---|---|
| DE | 102004012952 A1 | 12/2005 |
| DE | 102005002337 A1 | 8/2006 |
| DE | 102009054055 A1 | 5/2011 |
| DE | 102013221038 A1 | 4/2015 |
| DE | 102014218581 A1 | 3/2016 |

* cited by examiner

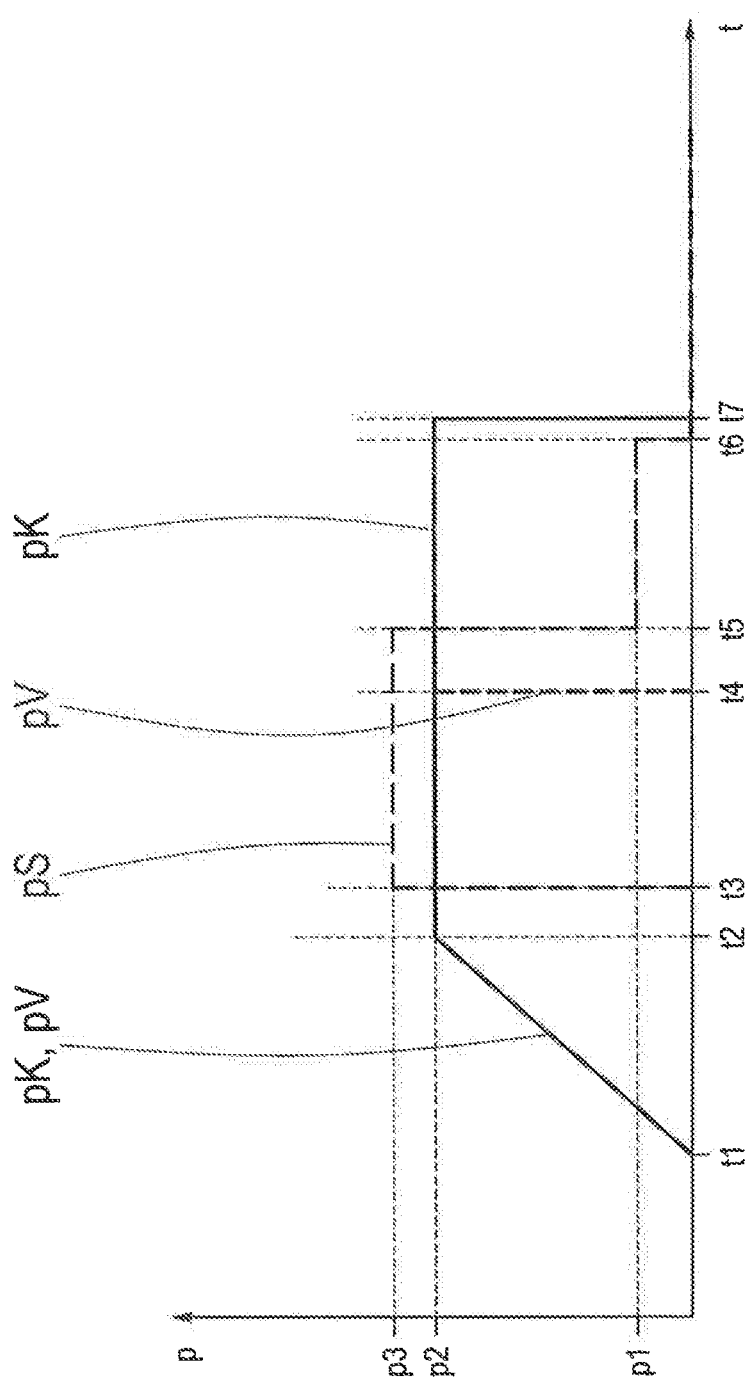

HYDRAULIC SYSTEM FOR AN AUTOMATIC TRANSMISSION

FIELD OF THE INVENTION

The invention relates to a hydraulic system for an automatic transmission, an automatic transmission, and a method for operating the hydraulic system.

BACKGROUND

With automatic transmissions for motor vehicles, such as is known (for example) from DE 10 2005 002 337 A1, the transmission ratio stages are adjusted by means of shifting elements, also referred to as clutches. Clutches may connect two rotatable elements together, and one element connected in a torque-proof manner to the transmission housing to one rotatable element. In the latter case, one also speaks of a brake. Thereby, the shifting elements are formed as frictional-locking multi-disk clutches and positive-locking shifting elements, such as claw couplings (i.e., dog clutches). In order to carry out power shifts, i.e. a change to the transmission ratio without an interruption of the pulling force, at least one part of the shifting elements must be formed as frictional-locking shifting elements.

With known automatic transmissions, actuation (i.e. the locking of the shifting elements for the transfer of torque) takes place hydraulically, i.e. by means of actuators in the form of piston-cylinder units, which are subjected to a pressure medium, typically transmission oil. A clutch pressure chamber is formed from the piston and the cylinder; for the actuation of the shifting element, this is subjected to a pressure oil under a control pressure. The pressure oil is conveyed by a motor-driven pump as a pressure source and, in particular for frictional-locking shifting elements during their entire duration of actuation, must be kept at a pressure level that produces pressing force of the multi-disks in the shifting element that is sufficient for the transfer of torque. The energy to generate pressure by means of the hydraulic pump must be applied by the engine of the motor vehicle, which has effects on fuel consumption and CO2 emissions. Due to the power losses, the energy available for the drive of the vehicle is reduced, by which the transmission efficiency of the drive train is lowered.

In addition, leakage losses arise at sealing points, such as pressure oil supply lines from the transmission housing through so-called "rotary oil supply lines," which are sealed by means of gap seals, such as slide bearings and/or rectangular rings, in the rotating transmission shaft. This requires an ongoing tracking of the oil pressure in the actuator with a locked shifting element or a replenishment of the leakage amount, in order to keep the shifting element locked.

In order to make the pressure in the actuator of the clutches independent of the supply pressure generated by the pump, and to keep the leakage losses to a minimum, the clutch pressure chamber can be sealed by a so-called "stop valve," such that the clutch pressure prevailing therein is maintained without additional oil having to be replenished. Only during the shifting process is the valve opened and then filled with the corresponding pressure. A hydraulic control device with a stop valve is known from DE 102 05 411 A1. The supply pressure to be generated by the transmission pump can be lowered with respect to the clutch pressure trapped in the shifting element, by which the power consumption of the transmission oil pump, which is calculated as the product of the conveyed volume flow and the generated pressure difference, is significantly reduced. With the lower power consumption of the transmission pump, the overall efficiency of the transmission increases, since less engine power has to be branched off for the hydraulics as reactive power, and fuel consumption is reduced for the same performance. The stop valve known from DE 102 05 411 A1, without being subject to pressure, remains in the shut-off position, thus even at the standstill of the pump or the motor that drives the pump. Such a functioning of a stop valve, which remains closed even if the hydraulic system is pressureless (i.e. is at the level of the ambient pressure), is referred to as "normally closed". Hereinafter, a hydraulic system that is under ambient pressure and is not subjected to a pressure generator such as a pump is referred to as "pressureless".

In terms of functional reliability, it is thereby disadvantageous that the stop valve, and thus the relevant shifting element, can no longer be opened upon the stop or failure of the engine or the pump, and thus a lack of pressurization of the automatic transmission, such that a malfunction that blocks the drive train may arise.

The functioning of a stop valve, which is open upon the standstill of the pump or a pressureless system typically under the action of a spring, by which the clutch pressure degrades to ambient pressure, is referred to as "normally opened". This functioning offers a major advantage in terms of functional reliability of a transmission, since, upon a failure of the hydraulic pressure supply, the power flow in the transmission is interrupted. However, in a disadvantageous manner, the stop valve must be constantly subjected to a control pressure in order to keep it closed. With a suitable design of the stop valve, particularly the selection of surfaces of a closing piston subjected to control pressure and clutch pressure, the control pressure may be significantly lower than the clutch pressure.

DE 102013221038.8, which was not pre-published, discloses a stop valve that is configured as "normally opened." This essentially comprises a cylindrical closing piston, which is referred to as a so-called "seat piston" if the stop valve is formed as a seat valve. In this case, the closing piston is subjected from one side by the clutch pressure and from the other side by the control pressure. Due to the ratios of the pressurized surfaces of the closing piston, the control pressure, and thus at least the pressure generated by the pump, is significantly lower than the clutch pressure. With a pressureless hydraulic system, under the action of a compression spring, the stop valve opens the clutch pressure chamber for the remaining pressureless hydraulic system.

DE102014218581.4, which is also not pre-published, shows a possible embodiment of a "normally opened" stop valve, with which the control pressure can be further reduced compared to the trapped clutch pressure, as the clutch pressure chamber is not closed by the closing piston itself, but by means of a ball as a closing body, which is pressed by the closing piston over a ramp against a valve seat in a clutch channel to the clutch pressure chamber. Thereby, several balls can be distributed around the circumference. The closing piston is ring-shaped or formed in the shape of a hollow cylinder, and is arranged around a shaft concentric to it. Further, the ring-shaped closing piston is arranged radially inside of a shifting element. The radial expansion of the closing piston is relatively low, such that this embodiment is an arrangement with a low need for radial installation space, and does not require an additional axial structural length. The ring-shaped surface subjected to the control pressure is solely opposed to the relatively small projection surfaces of the balls subject to the clutch pressure, such that, compared to a stop valve designed according to DE102013221038.8, the surface subjected to the clutch pressure is significantly smaller than the space subject to the control pressure. However, the limit of the reduction of the surfaces is specified by a minimum value of the flow cross-section of the channels closed by means of the balls, below which the shifting element is not able to be filled quickly enough.

In addition, the full amount of the clutch pressure does not counteract the control pressure; rather, based on the application of force by the ball over a conical, chamfer-shaped ball ramp, which is formed on the piston, only one axial force component of the clutch pressure counteracts it. Thereby, it is possible to further lower the control pressure for closing the stop valve and thus the power consumption of the pump.

SUMMARY OF THE INVENTION

A task underlying the invention is to create a stop valve that operates in a "normally opened" manner, with which, with a simple design and space-saving structure, the amount of the hydraulic pressure, which is necessary to keep the stop valve and thus the shifting element closed, is as low as possible. Additional objects and advantages of the invention will be set forth in part in the following description, or may be obvious from the description, or may be learned through practice of the invention.

Accordingly, a hydraulic system for operating an automatic transmission for motor vehicles comprises at least one hydraulic actuator for operating a clutch and at least one stop valve, whereas the actuator features a pressurizable actuating pressure chamber, which can be closed in a pressure-tight manner by means of the stop valve, such that the clutch pressure is maintained independent of the other pressures of the hydraulic system. The stop valve comprises a closure device and a valve housing with an actuating pressure chamber port connected to the actuating pressure chamber, a supply pressure port, and a control pressure port. The closure device is movable by means of a hydraulic control pressure into a closed position, in which the actuating pressure chamber port, and thus the actuating pressure chamber, is closed by the closure device. At least by means of the force of the clutch pressure trapped in the actuating pressure chamber, the closure device is movable into an open position, in which the actuating pressure chamber port is opened. In accordance with the invention, the stop valve features a shiftable locking device, by means of which the closure device can be fixed in the closed position.

Thereby, advantageously, the clutch remains closed independent of the pressures prevailing in the hydraulic system as long as the closure device is fixed in the closed position by means of the locking device, such that, theoretically, no pressure needs to be generated by a transmission pump and thus no power needs to be added to ensure the transfer of torque for the clutch.

In an advantageous embodiment of the invention, the locking device is formed and arranged in such a manner that, by means of this, a positive-locking connection between the closure device and the valve housing can be established, by the locking device being shiftable into a locked position when the closure device is in the closed position. This ensures that the closure device is only locked on the valve housing if the actuating pressure chamber port is closed.

The hydraulic system is formed in an arrangement such that the locking device comprises at least one locking piston, which is arranged in a displaceable manner in a locking piston bore and, by means of being subjected to the control pressure, is displaceable from a locked position into the locked position, and is held in the locked position by the control pressure. Since the closure device is moved, by means of the control pressure, from the open position into the closed position, it serves to simplify the hydraulic system, and to hydraulically undertake the actuation of the locking device. Thus, the pressure to be generated by the transmission pump must only be so high in order to hold the locking piston in the locked position. Advantageously, through this drop in pressure, a strong reduction in the power consumption of the transmission pump is possible.

In a preferred embodiment, the locking device is formed in such a manner that the amount of control pressure that is necessary to hold the locking device in the locked position is smaller than the amount of control pressure that is necessary to move the closure device from the open position into the closed position, or hold it there.

Thereby, it is possible that the positive-locking connection between the closure device and the valve housing is established solely by the locking piston(s), such that additional components are not required.

Alternatively, it is also possible for the locking of the closure device to take place electromechanically. Advantageously, no hydraulic pressure needs to be generated by the transmission pump in the hydraulic system in order to keep the clutch closed.

In a preferred embodiment, it is possible that the locking device comprises at least one fastening element, whereas each locking piston is allocated with at least one fastening element, which is in operative connection with the at least one locking piston and is movable by it. Thereby, in the locked position with both the valve housing and the closing piston, the fastening element is located in a positive-locking connection, and thus is effective as a connecting link for establishing the positive-locking connection between the closing piston and the valve housing. Thereby, it is possible to adapt the locking device to the conditions of the existing installation space, or to provide a transmission of the force ratios.

In an additional embodiment of the invention, it is possible that the closure device comprises a closing piston, a press-on element, at least one spring element, and at least one closing body, whereas the closing piston in the closed position is effective through the press-on element and the spring element at the at least one closing body, such that it closes the actuating pressure chamber port, whereas the press-on element is arranged in a manner displaceable to this in an axial direction relative to the closing piston. The spring element is arranged in an axial direction at least partially between the press-on element and the closing piston. Thereby, it is possible to compensate for tolerances and ensure a secure closing of the actuating pressure chamber port.

In this connection, an additional embodiment shows that the at least one closing body is formed as a closing ball, the spring element is formed as a disk spring and the press-on element is formed as a conical ring, whereas the conical ring features a ball ramp, through which the closing piston is effective at least upon its movement in the closed position to the at least one closing ball. Thereby, the direction of movement or force of the closing piston is not equal to the direction of movement or force of the closing ball if the closing piston is subject to the control pressure effective in the control pressure chamber and is moved into the closed position. The effect of this embodiment is to increase the sealing force that is effective on the closing ball, through a wedge effect.

It is possible that the closing piston bore and a locking ball bore are formed inside the closing piston, whereas the locking ball bore and the locking piston bore at least partially penetrate at right angles to each other, and that the fastening element is designed as a locking ball, which is at least partially arranged inside the closing piston in the locking ball bore, or is guided in its direction. Thereby, in the outer contour of the locking piston, a locking piston groove is formed in such a manner that the locking ball is at least partially located in the locking piston groove and has a smaller radial distance to the locking piston axis if the locking piston is in the unlocked position than if the locking piston is located in the locked position and the locking ball makes contact at the cylindrical outer contour of the locking piston. Thus, advantageously, the closing ball can be moved by the locking piston away from it at a right angle to its direction of movement in a radial direction in relation to the locking piston. Thus, a reversal of the direction of force is possible, by which a transmission of the force ratios or an adjustment to the given installation space is possible. In addition, the arrangement of the locking piston and the locking ball in the closing piston allows for a compact design.

Alternatively, it is also possible to arrange the closing piston, and/or the locking piston and the associated locking ball, in the valve housing.

In an additional embodiment, it is possible that, in an inner housing contour of the valve housing that surrounds the closing piston on its outer contour, an engaging groove running concentrically to a closing piston axis is formed to at least partially receive a locking ball. Thereby, the axial position of the engaging groove is selected in such a manner that it is then covered by the locking ball bore to the extent that the locking ball is able to be engaged by means of the locking piston to locking in the engaging groove, if the closing piston is in the closed position and the conical ring has been displaced to the extent that the preload force of the spring element is sufficient to hold the actuating pressure chamber port closed over the ball ramp.

In a particularly preferred embodiment, the closing piston is at least partially formed as a hollow cylindrical annular piston, which is displaceable in an annular piston chamber at least partially shaped as a cylinder barrel that is formed inside the valve housing axially between the closed position and the open position. Thereby, advantageously, if the annular piston can be arranged around a shaft, an arrangement of such a stop valve in a transmission that saves a large amount of installation space is possible.

In an advantageous embodiment of this variant, it is provided that a locking piston axis of the at least one locking piston bore is arranged in a manner essentially parallel to a closing piston axis of the annular piston, whereas the at least one locking piston bore is at least partially penetrated by the locking ball bore, which is directed radially to the two center axes. Thereby, the locking piston is formed with respect to its outer contour such that, upon a movement of the locking piston into the locked position, the closing ball is displaceable from the locking piston essentially perpendicular to the direction of movement of the locking piston or to the center axis of the closing piston and the center axis of the locking piston bore in a radial direction with respect to the two center axes in an engaging groove concentrically formed at the center axis in the valve housing. Through the arrangement of the locking piston inside the annular piston, the design of a stop valve that is compact and saves installation space is possible.

In this connection, it is possible that the valve housing is formed at least by one clutch hub and one shaft, whereas the clutch hub is arranged radially outside the annular piston, and the shaft is arranged radially inside the annular piston, whereas the engaging groove is formed in the inner housing contour of the clutch hub, and the at least one closing ball is movable radially outward from the annular piston through the allocated locking piston.

Alternatively, it is possible that the closing balls are displaceable partially from the annular piston radially inward through the closing piston.

With an alternative to an embodiment of the closing piston as an annular piston, it is possible that the closing piston is formed as a cylindrical piston. This can be arranged concentrically to this in a shaft. With this alternative, it would be possible to arrange a single locking piston concentrically to the cylindrical closing piston, which, similar to a linear cam shift, acts on several closing balls.

It is preferably provided in one variant that an unlocking spring is arranged in the locking ball bore between the locking piston and one end of the locking piston bore turned away from the control pressure chamber, which unlocking spring is preloaded in the locked position of the locking piston. Thereby, if the control pressure falls below a certain value, the locking piston is movable into the unlocked position at least by means of the force of the unlocking spring, such that the locking device is unlocked.

In an advantageous embodiment of the invention, it is possible that a connecting channel is formed in the closing piston between the end of locking piston bore turned away from the control pressure chamber and a part of the annular piston chamber in which the compression spring is arranged, such that the side of the locking piston turned away from the control pressure chamber can be subjected to the supply pressure and is thus movable into the unlocked position, if the sum of the forces acting on the locking piston from the supply pressure and the unlocking spring exceeds the opposing force of the control pressure. This variant has the advantage that the locking piston is movable into the unlocked position by means of an increase in the supply pressure, even if the control pressure cannot be lowered, due to a malfunction, for example.

Alternatively, it is possible that only the closing piston and no unlocking spring is arranged in the locking piston bore, whereas the locking piston bore is connected through the connecting bore to the supply pressure chamber. This has the advantage that a lower control pressure is required to hold the locking piston in the locked position, since the control pressure no longer counteracts the force of the unlocking spring.

Preferably, it is possible that a pressure spring is arranged in the supply pressure chamber between the closing piston and the valve housing in such a manner that it is preloaded at least in the closed position of the closing piston, and displaces the closing piston into the open position, if the control pressure corresponds to ambient pressure. Thereby, the stop valve securely opens if the drive of a transmission—and thus the transmission pump—fails and the hydraulic system is pressureless. A stop valve formed in such a manner is effective in a "normally opened" manner, by which undefined shifting states can be excluded.

It is possible that an automatic transmission that comprises a shaft and a clutch hub features a stop valve arranged with an annular piston, whereas the annular piston is arranged concentrically to a shaft axis of the shaft around the latter, and is arranged radially inside the clutch hub that is likewise arranged concentrically to the shaft. Thereby, a space-saving arrangement of a stop valve is also possible.

In a method for operating a hydraulic system of an automatic transmission with a stop valve according to one of the described embodiments, for closing the corresponding clutch, the supply pressure is initially raised to a transfer pressure value of the desired clutch pressure, at which the clutch is closed, whereas, after reaching the desired transfer pressure value of the clutch pressure, the control pressure is raised starting from zero or a low pre-filling pressure to a resealing pressure value, which is greater than the transfer pressure value of the clutch pressure to the extent that the closure device can be moved into the closed position against the supply pressure. After the closing of the shifting element, the pressure in the hydraulic system and/or the control pressure is lowered to a locking pressure value that is sufficient to hold the locking device in the locked position, such that the closure device remains in the closed position and the clutch to be closed remains closed. To open the clutch, the control pressure is reduced starting from the locking pressure value to the extent that the locking device, at least due to the effect of the force of the unlocking spring, is shifted into the unlocked position, and the closure device is shifted by the force of the compression spring and at least the trapped clutch pressure into the open position.

BRIEF DESCRIPTION OF THE DRAWINGS

Embodiments of the method in accordance with the invention are presented in the drawings, and will be described in more detail below.

The following is shown.

DETAILED DESCRIPTION

Figure 1:
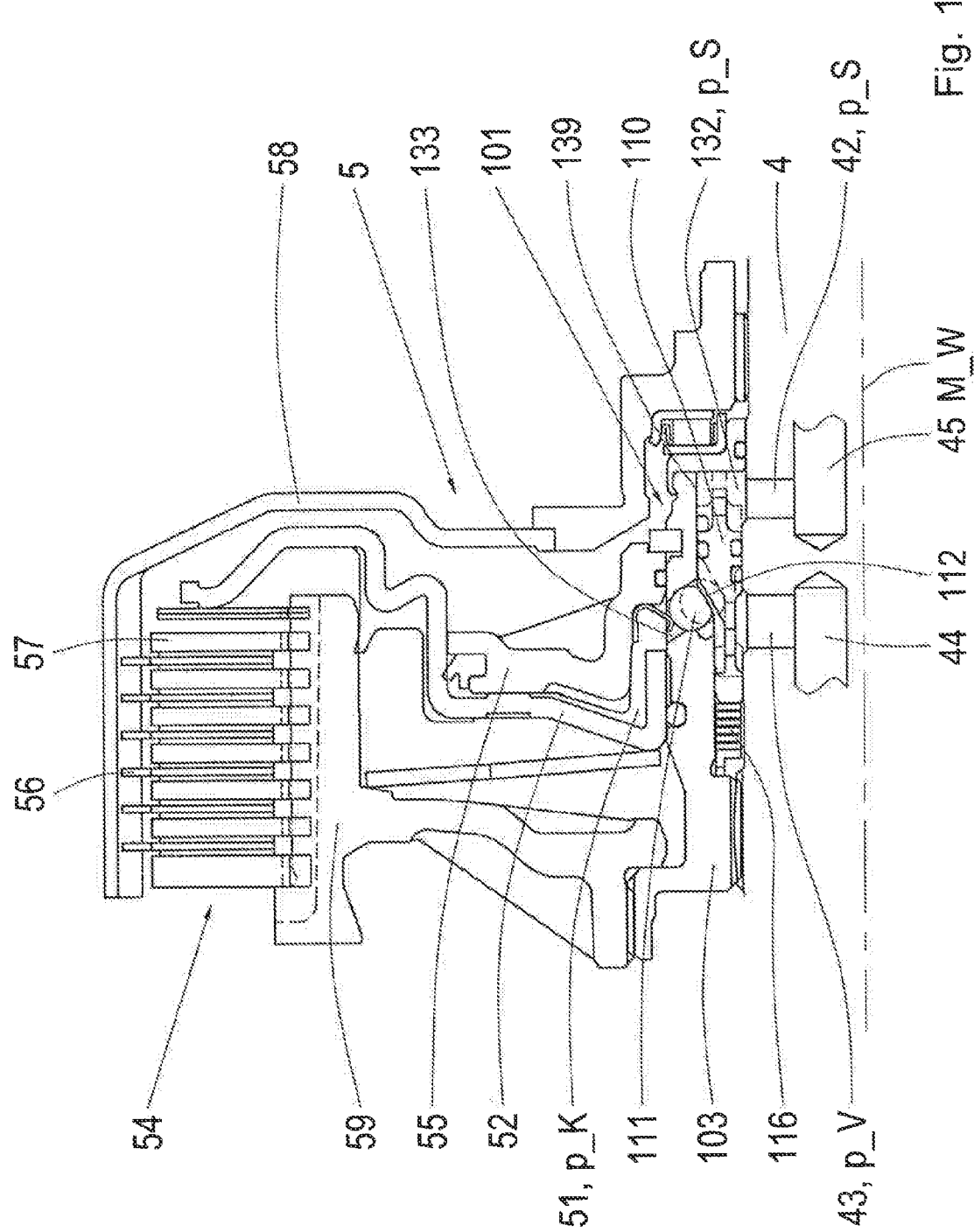
FIG. 1 partial section through a transmission with a stop valve according to the state of the art.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a partial section through a transmission, whereas, in the partial section, a hydraulically actuated clutch 5, a shaft 4, a clutch hub 103 and a stop valve 101 according to the state of the art are shown. In the partial section, based on the essentially rotationally symmetrical design of the arrangement around a shaft axis M_W, only one half is shown. The clutch 5 comprises a clutch piston 52, a clutch hub 103, a multi-disk pack 54 with outer multi-disks 56 and inner multi-disks 57, an outer multi-disk carrier 58, an inner multi-disk carrier 59 and a support plate 55, whereas an actuating pressure chamber 51 is formed between the support plate 55 and the clutch piston 52. The clutch 5 is arranged concentrically at the shaft 4 and at the shaft axis M_W. In a radial direction relative to the shaft axis M_W, the stop valve 101 is arranged between the shaft 4 and the clutch 5.

The clutch 5 is operated by subjecting the actuating pressure chamber 51 to hydraulic pressure. The pressure acts in an axial direction opposite to the clutch piston 52 and the support plate 55. Hereinafter, the term "axial" refers to the shaft axis M_W. Since the support plate 55 is axially supported on the clutch hub 103, the clutch piston 52 is pressed against the multi-disk pack 54, by which the outer multi-disks 56 and the inner multi-disks 57 are pressed against each other, by which a frictional-locking transfer of torque can be produced between the outer multi-disk carrier 58 and the inner multi-disk carrier 59. In the following, under "actuation of a clutch," the closing of a clutch for producing this transfer of torque is meant.

Figure 2:
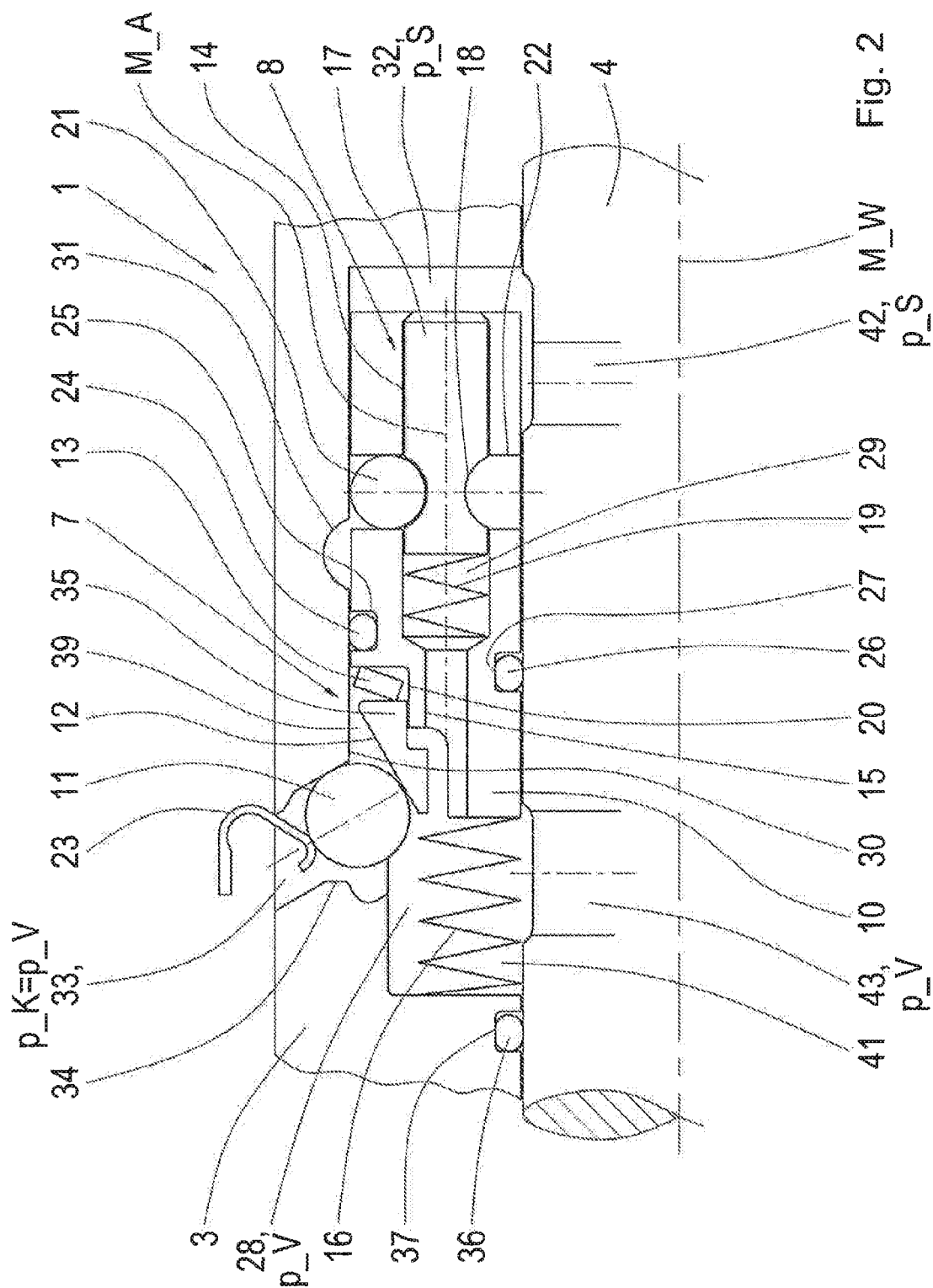
FIG. 2 a partial section through a stop valve in accordance with the invention with a closure device, which is in the open position, and with a locking device, which is in the unlocked position.

The stop valve 101 comprises an annular piston 110, at least one closing ball 111, at least one compression spring 116 and one valve housing, which is at least partially formed by the shaft 4 and partially by the clutch hub 103. In the clutch hub 103, at least one actuating pressure chamber port 133 is formed, which is connected to the actuating pressure chamber 51 of the clutch 5. In the shaft 4, at least one control pressure port 42 and at least one supply pressure port 43 are formed. A valve seat 34 shown in FIG. 2 is formed inside the actuating pressure chamber port 133. The size of the closing ball 111 and the arrangement of the valve seat are selected in such a manner that the actuating pressure chamber port 133, and thus the actuating pressure chamber 51, are closed if the closing ball 111 makes contact with the valve seat. The control pressure port 42 is connected to a control pressure channel 45 which is formed in the shaft 4. The supply pressure port 43 is connected to a pressure supply channel 44, which is likewise formed in the shaft 4. Preferably, several actuating pressure chamber ports 133 and closing balls 111 are evenly distributed around the circumference, such that there is an adequate line cross-section for filling and emptying the actuating pressure chamber 51. This also applies to the control pressure ports 42 and the supply pressure ports 43. Regarding the graphic representation, in each case, an actuating pressure chamber port 133, a control pressure port 42, and a supply pressure port 43 has been rotated in the drawing plane.

The annular piston 110 features an essentially hollow cylindrical shape with a cylindrical inner contour and a cylindrical outer contour. It is arranged concentrically to the shaft axis M_W around the shaft 4, and is displaceable between two end positions axially along the shaft 4 or the clutch hub 103 into an annular piston chamber 139 formed between the shaft 4 and the clutch hub 103. A control pressure chamber 132 is formed between a first end of the annular piston 110 and the clutch hub 103; this is connected by the control pressure port 42 to a shaft 4 formed in the control pressure channel 45 and is thereby subjected to a control pressure p_S. The compression spring 116 is arranged between a second end of the annular piston 110 and the clutch hub 103. The first end of the annular piston 110 features an outer diameter that is larger than that of the second end. Between the two ends, a chamfer-shaped ramp 112 is formed in the transition between the two different outer diameters.

If the control pressure p_S is equal to zero or so low that the force acting from this on the annular piston 110 is smaller than the force of the compression spring 116, the annular piston 110 takes its first end position and, with its first end in the control pressure chamber 132, makes contact at the clutch hub 103. In this position of the annular piston 110, the closing ball 111 is not pressed against the valve seat of the actuating pressure chamber port 133, such that the actuating pressure chamber 51 is open. Therefore, this position of the stop valve 101 and/or the annular piston 110 is also referred to as the open position. Under the effect of the force of the control pressure p_S, this is shifted against the force of the compression spring 116 and the force that generates the supply pressure p_V over a surface subjected to this, into the so-called "closed position." Thereby, the annular piston 110, with the ball ramp 112 formed on it, displaces the closing ball 111 to the valve seat formed in the actuating pressure chamber port 133. If the closing ball 111 makes contact with this, the actuating pressure chamber 51 is closed and the annular piston 110 and/or the stop valve 101 has reached its closed position.

The slopes of the actuating pressure chamber port 133 and the ball ramp 112 are accordingly selected and coordinated. Preferably, a center axis of the actuating pressure chamber port 133 is perpendicular to a cross-sectional line of the ball ramp 112. Due to the slope of the ball ramp 112 and thus its force acting on the closing ball 111, a wedge effect arises, such that the force of the closing ball 111 acting on the valve seat is higher than if this were pressed in a purely axial direction by the annular piston 110. Thereby, the amount of the control pressure p_S that would be required to keep the closing ball 111 closed against the trapped clutch pressure p_K can be reduced to a level significantly below the amount of the clutch pressure p_K, such that the minimum pressure generated by the transmission pump can be reduced to the amount of the control pressure p_S. An additional lowering of the control pressure p_S with a stop valve designed in such a manner is achieved through the ratios of the pressurized surfaces at the annular piston 110 and the closing ball 111. Thus, the pressure generated by the transmission pump, and thus its power consumption, can be significantly reduced, resulting in a higher transmission efficiency and a lower fuel consumption.

If the drive motor of the transmission or the drive of the transmission pump is turned off, the hydraulic system of the transmission, and thus also the control pressure p_S, is pressureless, such that the force of the compression spring 116 and the force component of the clutch pressure p_K—with additional consideration of the pressurized surfaces at the annular piston 110 and the closing ball 111—displace the annular piston 110 into the open position or shifts the stop valve 101 into the open position, as the case may be. Such a stop valve, which for a pressureless system is opened, is also referred to as "normally opened".

FIG. 2 shows a schematic partial section through a stop valve 1 in accordance with the invention. The stop valve 1 comprises a closure device 7, a locking device 8 and a valve housing, which is formed at least by one part of a clutch hub 3 and at least one part of a shaft 4.

The closure device 7 comprises a circular piston 10, a closing body that is designed as a closing ball 11, a conical ring 35 as a press-on element for the closing ball 11, a disk spring 13 as a spring element and a compression spring 16. In contrast to the stop valve 101 according to the state of the art, in FIG. 1, a ball ramp 12 is not formed directly on the annular piston 10, but is formed on the conical ring 35 arranged on the annular piston 10.

At least one actuating pressure chamber port 33 is formed in the clutch hub 3. At least one control pressure port 42 and at least one supply pressure port 43 are formed in the shaft 4. A valve seat 34 is formed inside the actuating pressure chamber port 33. The size of the closing ball 11 and the arrangement of the valve seat 34 are selected such that the actuating pressure chamber port 33 is closed when the closing ball 11 make contact with the valve seat 34. Preferably, several actuating pressure chamber ports 33 and closing balls 11 are evenly distributed around the circumference, such that there is an adequate line cross-section for filling and emptying the actuating pressure chamber. Likewise, several control pressure ports 42 and supply pressure ports 43 are formed in the shaft 4, and are distributed around the circumference. Regarding the graphic representation, in each case, an actuating pressure chamber port 133, a control pressure port 42 and a supply pressure port 43 has been rotated in the drawing plane. The opening and closing of the actuating pressure chamber port 33 is carried out, analogously as described in FIG. 1, through the lowering and raising of the control pressure p_S.

The locking device 8 comprises a locking piston 17, a locking ball 21 and an unlocking spring 19.

The annular piston 10 features an essentially hollow cylindrical shape with a cylindrical inner contour with an inner diameter D_Ri and an outer cylindrical contour with a maximum outer diameter D_Ra. It is arranged concentrically to the shaft axis M_W around the shaft 4 and axially along the shaft 4, and/or the clutch hub 3, which is also arranged concentrically to the shaft axis M_W, in which the annular piston chamber 39 formed between the shaft 4 and the clutch hub 3 is displaceable between two end positions. Thereby, as in FIG. 1, the term "axial" refers to a shaft axis M_W of the shaft 4 in the following figures as well. An inner housing contour 30 of the clutch hub 3 and an outer contour of the shaft 4 are also at least partially cylindrical.

A control pressure chamber 32 is formed between a first end of the annular piston 10 and the clutch hub 3; this is subjected to a control pressure p_S through the control pressure port 42. A supply pressure chamber 28, in which the compression spring 16 is arranged, is formed between a second end of the annular piston 10 and the clutch hub 3. In order to prevent leakage from the supply pressure chamber 28, it is sealed by means of a sealing ring 36, which is arranged in a seal ring groove 37 in the clutch hub 3. The clutch hub 3 leads to the shaft 4 back to the supply pressure chamber 28, in a radial direction from the shaft 4 of the supply pressure port 43 and radially from the outside of the clutch hub 3 of the actuating pressure chamber port 33. The supply pressure chamber 28 is subjected to the supply pressure p_V. For a sealing between the supply pressure chamber 28 and the control pressure chamber 32, on the annular piston 10, a seal ring groove 25 is formed at its outer contour and a seal ring groove 27 is formed at its inner contour, inside of which a sealing ring 24 or a sealing ring 26, as the case may be, is arranged.

The outer diameter D_Ra at the first end of the annular piston 10 is larger than the outer diameter at the second end of the annular piston 10. Between the two ends, in the transition of the two different outer diameters, a conical ring guide 20 with a cylindrical outer contour is formed as an indent; the conical ring 35 is arranged in a manner axially displaceable to this. In a radial direction, the conical ring 35 is centered at the annular piston 10, and is displaceable at a maximum inside a clearance fit. The disk spring 13 is also arranged around the conical ring guide 20, and is arranged in an axial direction between the conical ring 35 and the part of the annular piston 10 with the largest outer diameter.

In an axial direction, from the end of the annular piston 10 that is turned towards the control pressure chamber 32, a locking piston bore 14 is formed in the annular piston 10 as a blind bore. In a radial direction to a center axis of the annular piston, which corresponds in the mounted state of the shaft axis M_W, the locking piston bore 14 is penetrated by a locking ball bore 22. The diameter of the locking ball bore 22 approximately matches the diameter of the locking ball 21. In the represented embodiment, a center axis of the locking ball bore 22 preferably intersects, at right angles, both the center axis of the locking piston bore 14 and the center axis of the annular piston 10, or the shaft axis M_W in the mounted state, as the case may be. In the mounted state of the locking device 8, an unlocking spring chamber 29 is formed between the locking piston 17 inserted into the locking piston bore 14 and the end of the locking piston bore 14 inside the annular piston 10; an unlocking spring 19 is arranged in this unlocking spring chamber 29.

In the annular piston 10, a connecting bore 15 is formed between the unlocking spring chamber 29 and the supply pressure chamber 28; through this, the unlocking spring chamber 29, and thus the locking piston 17, is subjected to the supply pressure p_V. Optionally, the connecting bore 15 can also be dispensed with, such that the unlocking spring chamber 29 is separated from the supply pressure chamber 28. However, this would have the disadvantage that the locking piston 17 could not be displaced by the supply pressure p_V, if, for example, due to a malfunction, the control pressure p_S could not be lowered to the opening of the actuating pressure chamber port 33. In addition, a pressure release of the unlocking spring chamber 29 would be provided, since pressure would build up in this based on the leakage through the control pressure p_S. Under a "pressure release," for example, a connection of the unlocking spring chamber 29 with an area in which an ambient pressure p0 prevails is understood.

The locking piston 17 features a locking piston groove 18, which is formed as a taper or a recess with a cross-section that is shaped as a circular segment. The radius of the circular segment thereby approximately corresponds to the radius of the locking ball 21. From its narrowest point up to the external diameter of the annular piston 10, the radial distance from the locking piston 17 inserted into the annular piston 10 corresponds at least approximately to a diameter of the locking ball 21.

In the cylindrical inner housing contour 30 of the clutch hub 3, in a manner directed radially outwards, an engaging groove 31 is formed as a recess with a cross-section that is shaped as a circular segment. Just like the locking piston groove 18, the radius of the cross-section of the engaging groove 31 approximately corresponds to the radius of the locking ball 21.

In the presentation in FIG. 1, the closure device 7 or the annular piston 10, as the case may be, is in the open position, and the locking device 8 or the locking piston 17, as the case may be, is in the unlocked position. This is the case if the forces of the compression spring 16, the clutch pressure p_K prevailing in the actuating pressure chamber and, if applicable, the supply pressure p_V are greater than the force of the control pressure p_S. The opening and closing of the actuating pressure chamber port 33 is carried out, analogously as described in FIG. 1, through the lowering and raising of the control pressure p_S.

Upon the filling of the actuating pressure chamber 51 of the clutch, the value of the control pressure p_S is theoretically zero; i.e. it corresponds to the ambient pressure p0, which is also referred to as "pressureless". In practice, the actuating pressure chamber 51 is subjected to a pre-filling pressure, which is so small that a clutch actuation cannot be performed, but it is ensured that a high volume is not required for filling the clutch, which would increase the actuating period of the clutch. The locking ball 21 is guided into the locking ball bore 22 and, in a radial direction to the shaft axis M_W, makes contact on the locking piston 17 in the locking piston groove 18. In a direction that is radially outwards, the path of the locking ball 21 is limited to a cylindrical section of the inner housing contour 30, such that the locking ball 21, even with a displacing force acting on the locking piston 17, is not forced out by this perpendicular to the locking piston axis M_A in a radially outward direction outside of the locking piston bore 14. Thereby, the locking piston 17 is held in the unlocked position by the locking ball 21 against the force of the unlocking spring preloaded in the unlocking spring chamber 29 or the additional force arising from the supply pressure p_V.

In the open position of the annular piston 10, the closing ball 11 has clearance between the conical ring 35 and the valve seat 34. In order to ensure that the closing ball 11 does not inadvertently close the actuating pressure chamber 51, as this would be possible (for example) under the effect of the centrifugal force upon a rotation of the clutch hub 3, a compensating spring 23 is arranged on the clutch hub 3 inside the actuating pressure chamber port 33 in such a manner that presses the closing ball 11 against the conical ring 35. Thereby, the closing ball 11 is lifted from the valve seat 34, or cannot rest against it, such that the actuating pressure chamber 51 towards the supply pressure port 43 is open.

If, in the open position, the actuating pressure chamber 51 is filled through the supply pressure port 43, the clutch pressure p_K prevailing in the actuating pressure chamber 51 corresponds to the supply pressure p_V.

Figure 3:
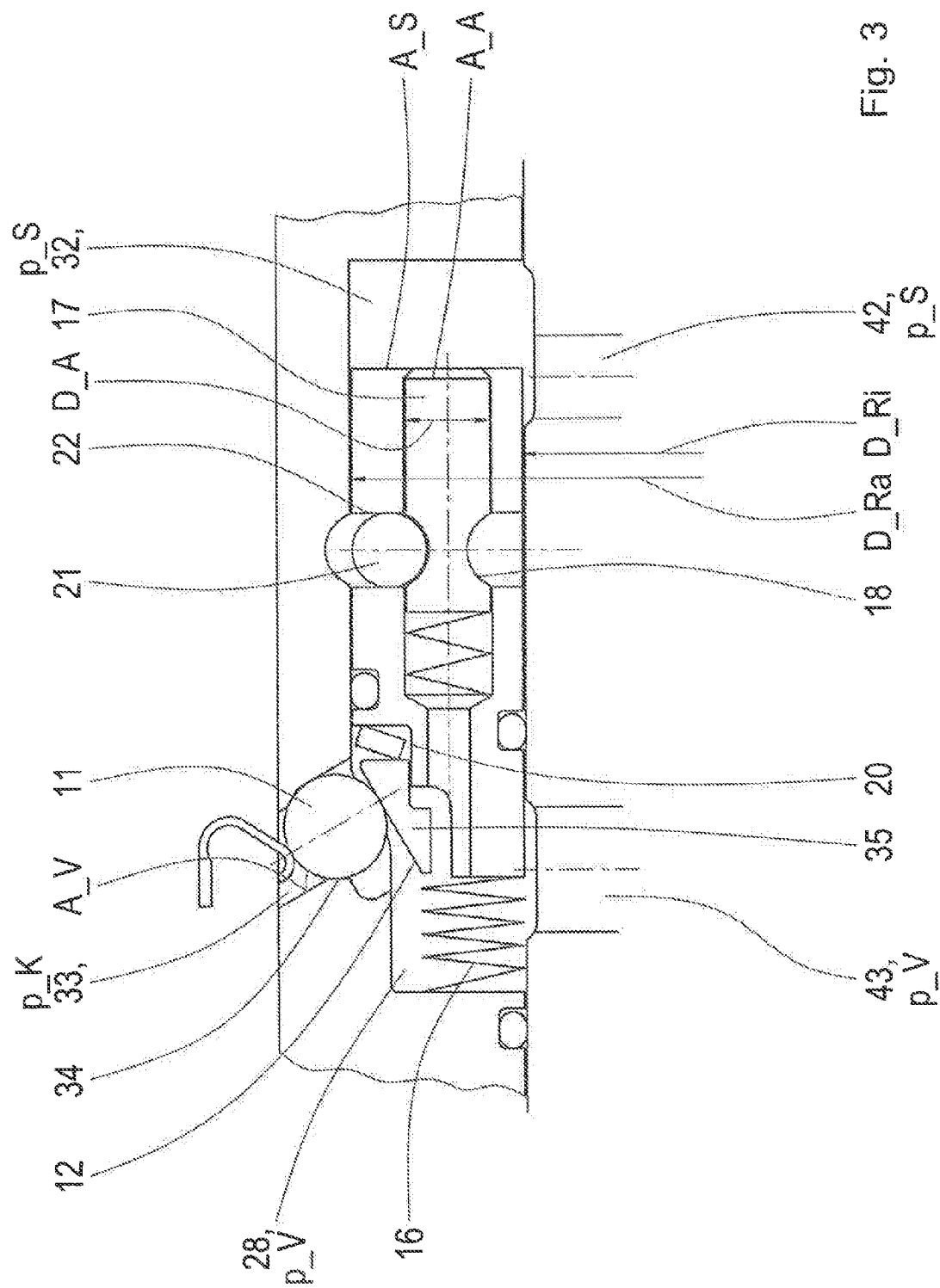
FIG. 3 a partial section through a stop valve in accordance with the invention with a closure device, which is in the closed position, and with a locking device, which is in the unlocked position.

FIG. 3 shows the stop valve 1 and the closure device 7 in the closed position. In this presentation, the locking device 8 is in the unlocked position. The closed position of the closure device 7 is brought about in order to, after the filling and pressurizing of the actuating pressure chamber 51 or the closing of the clutch, close the actuating pressure chamber 51 and thus make the trapped clutch pressure p_K independent of the pressure generated by the transmission pump. For this purpose, after the pressurization of the actuating pressure chamber 51, the control pressure p_S is raised to the extent that its force acting on the annular piston 10 through a control pressure surface A_S projected in an axial direction is greater than the sum of the forces of the compression spring 16 and the supply pressure p_V. As a result of the effect of the resulting force, the annular piston 10 is displaced toward the supply pressure chamber 28, whereas the closing ball 11 moves over the ball ramp 12 of the conical ring 35 in a slanted manner, according to the orientation of the actuating pressure chamber port 33 or the slope of the ball ramp 12 in the actuating pressure chamber port 33, until it makes contact with the valve seat 34 and closes the actuating pressure chamber port 33 and thus the actuating pressure chamber of the clutch. Thereby, after the closing ball 11 makes contact with the valve seat 34, the conical ring 35 is displaced against the force of the disk spring 13 axially to the annular piston 10, by which it is preloaded.

After the actuating pressure chamber port 33 is closed, the supply pressure p_V can be theoretically lowered down to zero, i.e. the ambient pressure p0. The control pressure p_S can be lowered to a value that is sufficient to hold the annular piston 10 in the closed position against the forces of the compression spring 16 and of the trapped clutch pressure p_K. Thereby, it should be noted that the clutch pressure p_K acts through the ball ramp 12 and the sum of the pressurized valve seat surfaces A_V of the closing balls 11, which is significantly lower compared to the control pressure surface A_S, by which the force effect of the clutch pressure p_K on the annular piston 10 is reduced.

Thereby, as already disclosed in the prior art, it is possible to advantageously lower the control pressure p_S to be generated by the transmission pump. A further lowering of the control pressure p_S is possible with the stop valve 1 according to the invention, if, in the closed position, the locking device 8 is also shifted into the locked position.

Figure 4:
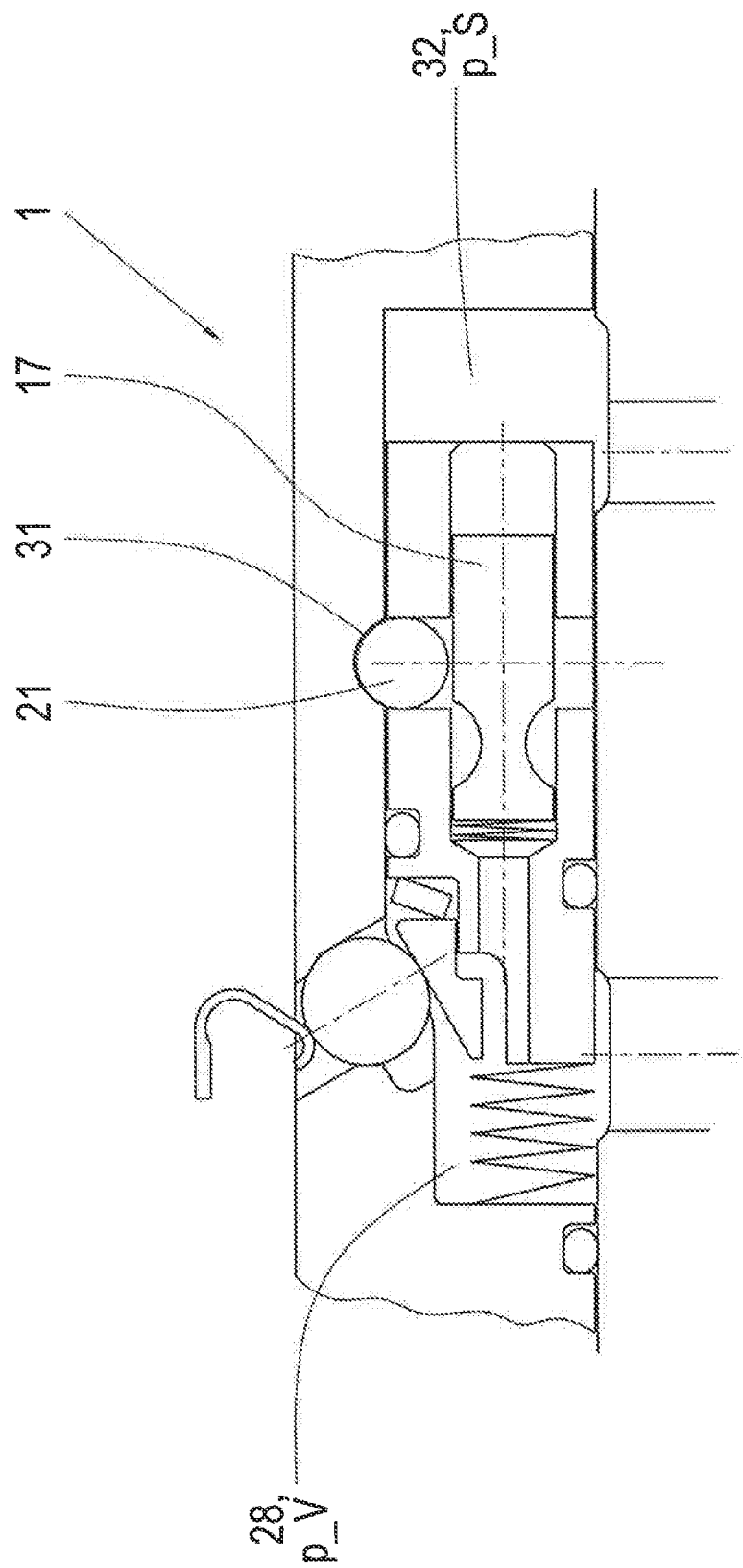
FIG. 4 a partial section through a stop valve in accordance with the invention with a closure device, which is in the closed position, and with a locking device, which is located in the locked position and FIG. 5 a diagram with the chronological progressions of the relevant pressures at the stop valve upon the closing and opening of a clutch pressure chamber.

FIG. 4 shows a partial section of the stop valve 1 according to the invention, whereas the closure device 7 is in the closed position and the locking device 8 is in the locked position. The locked position is brought about by raising the control pressure p_S to the extent that the locking piston 17 is displaced against the forces of the unlocking spring 19 and of the clutch pressure p_K in the direction of the unlocking spring chamber 29. The clutch pressure p_K and the control pressure p_S thereby act in the opposite direction on a locking piston surface A_A. Since the locking ball bore 22 is in the closed position of the annular piston 10 at the same axial position as the engaging groove 31 formed in the clutch hub 3, upon the movement of the locking piston 17, the locking ball 21 can be displaced in a radial direction from the locking piston groove 18 into the engaging groove 31. The locking ball 21 is then arranged in one part in the engaging groove 31 and in other part inside the locking ball bore 22 on the cylindrical outer contour of the locking piston 17. Thereby, a positive-locking connection between the valve housing and/or the clutch hub 3 and the closure device 7 with the locking ball 21 is established as a connecting link. The closure device 7 is then mechanically held against the forces arising from the compression spring 16 and the clutch pressure p_K, when the supply pressure p_V has been lowered to zero. The control pressure p_S must be only so great that its force is greater than the force of the unlocking spring 19, such that the positive-locking connection is maintained. The force arising from the control pressure p_S may even be less than the sum of the forces of the clutch pressure p_K through the ball ramp 12 and the compression spring 16. Thereby, compared to the state of the art, a further lowering of the control pressure p_S, and thus a reduction of the pressure to be generated by the transmission pump or its power consumption, are advantageously possible.

During the mechanical locking of the annular piston 10, the amount of the control pressure p_S or the power ratios of the hydraulic pressures acting on the annular piston 10 are without effect on the force with which the closing ball 11 is pressed against the valve seat 34, and thus have no influence on the sealing effect, since the forces of the pressures are supported through the positive-locking connection of the clutch hub 3. Therefore, the secure closing of the actuating pressure chamber port 33 requires that the closing ball 11 is securely and clearly pressed against the valve seat 34 even during the mechanical locking of the annular piston 10.

This is achieved through the buildup of a preload force at the closing ball 11 by means of the arrangement described below:

As described in FIG. 3, upon the displacement of the closure device 7 into the closed position after the contact of the closing ball 11 on the valve seat 34, the conical ring 35 is displaced as a press-on element against the force of the disk spring 13 axially at the annular piston 10, by which the disk spring 10 is preloaded. Thereby, the location—in an axial direction—of the engaging groove 31 at the annular piston 10 is selected in such a manner that a center axis of the locking ball bore 22 is at the axial position of the point of the largest diameter of the engaging groove 31, and/or the point of the symmetrical axis of the spherical segment-shaped cross-sectional area of the engaging groove 31 only if the conical ring 35 is displaced relative to the annular piston 10 and the disk spring 13 is preloaded. The effect of the preload force of the disk spring 13 must be so great that its force components acting through the ball ramp 12 on the closing ball 11 is greater than the force arising from the trapped clutch pressure p_K acting through the valve seat surface A_V on the closing ball 11. Theoretically, it would be conceivable to design an annular piston according to the state of the art in one piece with a ball ramp directly formed on this, and to lock the annular piston after pressing the closing ball on the valve seat. However, due to the manufacturing tolerances of the annular piston and the position of the engaging groove, a slight displacement of the annular piston is always possible, by means of which the pressing force of the closing ball on the valve seat is reduced, or the closing ball could even be detached from the valve seat.

If, at that point, the actuating pressure chamber or the actuating pressure chamber port 33 is opened, the control pressure p_S is lowered at least to the extent that the preloaded unlocking spring 19 can displace the locking piston 17 to the extent that the locking piston groove 18 is located at the same axial position as the engaging groove 31 and the locking ball bore 22. At that point, the locking ball 21 can move into a radial direction. Since, based on the clutch pressure p_K trapped in the actuating pressure chamber and the preloading of the compression spring 16, a force at the annular piston 10 is effective toward the control pressure chamber 32, if the locking ball 21 is displaced upon the movement of the annular piston 10 from the engaging groove 31 into the locking piston groove 18, the positive-locking connection between the annular piston 10 and the clutch hub 3 is released.

An increase in the supply pressure p_V prior to opening the actuating pressure chamber 51 is also possible, with the advantage that the clutch pressure p_K, and thus the capacity to transfer torque of the clutch, can be reduced in a controlled or governed manner in a steady course, in order to achieve high shifting comfort. In addition, the displacement of the closure device 7 in the open position is favored by the force effect of the supply pressure p_V. In addition, the supply pressure p_V acts through the connecting bore 15, in addition to the unlocking spring 19, on the locking piston 17, such that the locking device 8 also can be displaced into the unlocked position against a control pressure p_S, which is not lowerable for reasons of (for example) a malfunction, and thus the locking can be released.

FIG. 5 shows a diagram with the chronological progressions of the control pressure p_S, the supply pressure p_V and the clutch pressure p_K upon the closing and opening of a clutch pressure chamber.

At a point in time t1, released by a shift command from a transmission control, the actuation of a clutch, which is formed in accordance with the clutch 5 in FIG. 1, begins. For this purpose, the actuating pressure chamber 51 that was previously pressureless (i.e., at the level of the ambient pressure p0), is to be filled with an operating medium and subjected to hydraulic pressure. Alternatively, the actuating pressure chamber 51 may be subjected to the aforementioned pre-filling pressure. Starting at the point in time t1, at which the stop valve 1 is located in the open position shown in FIG. 2, the supply pressure p_V is increased by means of a pressure control device, which is not shown in the figures, in a linear course. For the sake of clarity, the linear course is a simplified representation in this diagram, since only the functioning of the stop valve 1 is to be shown here. Since the actuating pressure chamber port 33 is open, the clutch pressure p_K prevailing in the actuating pressure chamber 51 corresponds to the supply pressure p_V. The control pressure chamber 32 is pressureless at the point in time t1, i.e. the control pressure p_S is at the level of the ambient pressure. Theoretically, the control pressure p_S could also take on a value between zero and the amount of the supply pressure p_V.

At a point in time t2, the supply pressure p_V, and thus the clutch pressure p_K, reaches a transfer pressure value p2 as a target value, which is sufficient to close the clutch, such that the transfer of a desired torque is possible. In addition, through the connecting bore 15, the unlocking spring chamber 29 or the locking piston 17, as the case may be, is subjected to the supply pressure p_V, such that the locking piston 17 that is also weighed down by the preloaded unlocking spring 19 is held in the unlocked position.

After the pressure value p2 is securely reached and the pressurization of the clutch is completed, at a point in time t3, the control pressure p_S is, as ideally represented, abruptly set to a resealing pressure value p3, which is higher than the pressure value p2 of the clutch pressure p_K or the supply pressure p_V. This elevation of the control pressure p_S is required so that the annular piston 10 can be displaced by the control pressure p_S against the supply pressure p_V and the force of the compression spring 16 in the closed position, particularly since the pressurized surface on the side of the supply pressure p_V corresponds to the control pressure surface A_S subjected to the control pressure p_S. At that point, the closure device 7 or the annular piston 10 is displaced into the closed position described in FIG. 3, where the closing ball 11 is pressed against the valve seat 34 and the actuating pressure chamber port 33 closes. As that point, the clutch pressure p_K is no longer able to be affected by the supply pressure p_V. At a point in time t4, at which it is ensured that the closure device 7 has reached the closed position and the actuating pressure chamber port 33 or the actuating pressure chamber 51, as the case may be, is closed, the supply pressure p_V is reduced to ambient pressure. However, this could theoretically be a different pressure value, which is significantly lower than the transfer pressure value p2. As such, the control pressure p_S only counteracts the force of the compression spring 16 and the trapped clutch pressure p_K over the described unfavorable surface ratios. In addition, in the present example, only the force of the unlocking spring 19 acts on the locking piston 17, such that the locking piston 17 is displaced by the control pressure p_S into the locked position, in which the locking ball 21 establishes a positive-locking connection between the annular piston 10 and the clutch hub 3, as has been described under FIG. 4.

In order to ensure that the displacement of the locking piston 17 is completed in the locked position, the control pressure p_S is lowered to a locking pressure value p1 for the first time at a point in time t5. The amount of the locking pressure value p1 for the control pressure p_S is selected in such a manner that this is sufficient to hold the locking piston 17 in the locked position, such that the positive-locking connection between the annular piston 10 and the clutch hub 3 is maintained. The actuating pressure chamber 51 then remains closed and the clutch pressure p_K, and thus the transfer capacity of the clutch, is maintained, whereas, however, the control pressure p_S could be lowered to a pressure value that is lower compared to the state of the art, as would have been required for a hydraulic seal of the actuating pressure chamber. Accordingly, the maximum pressure to be generated by the transmission pump advantageously can be reduced to the locking pressure value p1.

At that point, at a point in time t6, for a further shifting process, the clutch is now to be opened, such that the clutch pressure p_K must be reduced. In the present example, the clutch pressure p_K is to be abruptly reduced. For this purpose, at the point in time t6, t the control pressure p_S is abruptly released (i.e., lowered to ambient pressure), such that the force of the unlocking spring 19 exceeds the force of the control pressure p_S at the locking piston 17 and, as a resulting force, displaces the locking piston 17 into the unlocked position. During the movement of the locking piston 17, as soon as the locking piston groove 18 covers the locking ball bore 22, through the effect of the forces of the compression spring 16 and the clutch pressure p_K on the annular piston 10, the locking ball 21 or the closing balls, as the case may be, is displaced from the engaging groove 31 into the locking piston groove 18, and the positive-locking connection between the annular piston 10 and the clutch hub 3 acting as a valve housing is released. Thereby, the annular piston 10 or the closure device 7, as the case may be, is displaced into the open position, which is reached at a point in time t7. The closing ball 11 rises, supported by the compensating spring 23, from the valve seat 34, and the clutch pressure p_K builds up to the pressure level of the pressureless supply pressure chamber 28 or the supply pressure p_V, as the case may be, which in the present example corresponds to the ambient pressure p0.

Optionally, the compression spring 16 could be dispensed with, since, after releasing the locking, the annular piston 10 theoretically could be displaced solely by the force of the trapped clutch pressure p_K into the open position. If, however, the angle of the ball ramp 12 is selected such that, in the closed position, there is a self-locking effect between the ball ramp and the closing ball 11, this is not possible. A shifting of the closure device into the open position would then be possible only by means of a correspondingly strong compression spring and/or a corresponding raising of the supply pressure p_V. However, a stop valve formed in such a manner would no longer be referred to as "normally opened." This also applies to a theoretically possible design of a described stop valve, the locking device of which does not feature an unlocking spring. The elimination of the unlocking spring has the advantage that the control pressure p_S, and thus the pressure to be generated by the transmission pump, is even further lowered, since the locking piston 17 no longer needs to be held against the force of the unlocking spring in the locked position.

After cutting off the control pressure p_S to the level of the ambient pressure p0, the locking piston 17 would be in an indifferent position and the locked position would be maintained. Only an increase in the supply pressure p_V would displace the locking piston 17 into the unlocked position, such that the locking balls 21 could come into the locking piston grooves 18, and thus the locking would be released. However, a stop valve formed in such a manner would have the disadvantages of a stop valve designed as "normally closed."

Modifications and variations can be made to the embodiments illustrated or described herein without departing from the scope and spirit of the invention as set forth in the appended claims.

REFERENCE SIGNS

1 Stop valve
3 Clutch hub
4 Shaft
5 Shifting element, clutch
7 Closure device
8 Locking device
10 Annular piston
11 Closing body, closing ball
12 Ball ramp
13 Disk spring
14 Locking piston bore
15 Connecting bore
16 Compression spring
17 Locking piston
18 Locking piston groove
19 Unlocking spring
20 Conical ring guide
21 Locking ball
22 Locking ball bore
23 Compensating spring
24 Sealing ring
25 Sealing ring groove
26 Sealing ring
27 Sealing ring groove
28 Supply pressure chamber
29 Unlocking spring chamber
30 Inner housing contour
31 Engaging groove
32 Control pressure chamber
33 Actuating pressure chamber port
34 Valve seat
35 Press-on element, conical ring
36 Sealing ring
37 Sealing ring groove
39 Annular piston chamber
41 Outer shaft contour
42 Control pressure port
43 Supply pressure port
44 Pressure supply channel
45 Control pressure channel
51 Actuating pressure chamber
52 Clutch piston
54 Multi-disk pack
55 Support plate
56 Outer multi-disks
57 Inner multi-disks
58 Outer multi-disk carrier
59 Inner multi-disk carrier
101 Stop valve
103 Clutch hub
110 Annular piston
111 Closing ball
112 Ball ramp
116 Compression spring
132 Control pressure port
133 Actuating pressure chamber port
139 Annular piston chamber
142 Control pressure port
143 Supply pressure port
A_A Locking piston surface
A_V Valve seat surface
A_S Control pressure surface
D_A Diameter of the locking piston
D_Ra Outer diameter of the annular piston
D_Ri Inner diameter of the annular piston
M_A Locking piston axis
M_W Shaft axis
p_K Clutch pressure
p_S Control pressure
p_V Supply pressure
p0 Ambient pressure
p1 Locking pressure value
p2 Transfer pressure value
p3 Resealing pressure value
t1 to t7 Point in time

The invention claimed is:

1. A hydraulic system for operating an automatic transmission for motor vehicles, the system comprising:
a hydraulic actuator for operating a clutch in the automatic transmission, the hydraulic actuator comprising an actuating pressure chamber;
a stop valve, the stop valve comprising an actuating pressure chamber port connected to the actuating pressure chamber to close the actuating pressure chamber in a pressure-tight manner such that clutch pressure is maintained independent of other pressures of the hydraulic system;
the stop valve further comprising: a supply pressure port; a control pressure port; a closure device movable by hydraulic control pressure into a closed position in which the actuating pressure chamber port, and thus the actuating pressure chamber, is closed by the closure device;
the closure device movable by means of clutch pressure trapped in the actuating pressure chamber into an open position in which the actuating pressure chamber port is opened; and a shiftable locking device that fixes the closure device in the closed position.

2. The hydraulic system according to claim 1, wherein the stop valve comprises a valve housing and the locking device is arranged such that a positive-locking connection between the closure device and the valve housing is established by the locking device being shiftable into a locked position when the closure device is in the closed position.

3. The hydraulic system according to claim 2, wherein the locking device comprises a locking piston arranged in a displaceable manner in a locking piston bore, the locking piston subjected to the control pressure for being displaced from an unlocked position into the locked position.

4. The hydraulic system according to claim 3,
wherein the closure device comprises an annular closing piston, a press-on element axially displaceable relative to the closing piston,
a spring element arranged axially between the press-on element and the closing piston, and a closing body;
wherein in the closed position, the closing piston is effective through the press-on element, the spring element, and the closing body to close the actuating pressure chamber port.

5. The hydraulic system according to claim 4, wherein the locking piston is allocated with a fastening element, wherein in the locked position of the locking piston, the fastening element is in a positive-locking connection with both the valve housing and the closing piston.

6. The hydraulic system according to claim 4, wherein the closing body is formed as a closing ball, the spring element is formed as a disk spring, and the press-on element is formed as a conical ring having a ball ramp configured such that a direction of movement of the closing piston to the closed position is not equal to a direction of movement of the closing ball upon the closing piston being subjected to control pressure effective in the control pressure chamber.

7. The hydraulic system according to claim 2, wherein:
the locking device comprises the locking piston arranged in a displaceable manner in the locking piston bore, the locking piston subjected to the control pressure for being displaced from an unlocked position into the locked position, the locking piston bore formed inside the closing piston;
a locking ball bore is formed inside the closing piston, wherein the locking ball bore and the locking piston bore are at right angles to each other;
a locking ball in the locking ball bore;
a locking piston groove formed in an outer contour of the locking piston in such a manner that the locking ball is at least partially located in the locking piston groove and has a smaller radial distance to an axis of the locking piston if the locking piston is in the unlocked position than if the locking piston is in the locked position and the locking ball makes contact at the cylindrical outer contour of the locking piston.

8. The hydraulic system according to claim 7, comprising an engaging groove in an inner housing contour of the valve housing that surrounds the closing piston, the engaging groove running concentrically to an axis of the closing piston and at least partially receives the locking ball, the engaging groove at an axial position such that is covered by the locking ball bore and the locking ball is engaged by the locking piston and movable radially into the engaging groove when the closing piston is in the closed position and the conical ring has been displaced to an extent that a preload force of the spring element holds the actuating pressure chamber port closed over the ball ramp.

9. The hydraulic system according to claim 7, wherein the closing piston is at least partially formed as a hollow cylindrical annular piston that is displaceable in an annular piston chamber formed inside the valve housing.

10. The hydraulic system according to claim 9, wherein an axis of the locking piston bore is parallel to an axis of the closing piston, the locking piston bore penetrated at least partially by the locking ball bore that is directed radially to the axes of the closing piston and the locking piston, and wherein upon a movement of the locking piston into the locked position, the closing ball is displaceable from the locking piston perpendicular to the axes of the closing piston and the locking piston bore into an engaging groove concentrically formed in the valve housing.

11. The hydraulic system according to claim 10, wherein the valve housing is formed by a clutch hub and a shaft, wherein the clutch hub is arranged radially outside the closing piston and the shaft is arranged radially inside the closing piston, the engaging groove formed in an inner housing contour of the clutch hub, and the closing ball movable radially outward from the closing piston into the engaging groove.

12. The hydraulic system according to claim 7, comprising an unlocking spring arranged in the locking ball bore between the locking piston and an end of the locking piston bore turned away from the control pressure chamber, the unlocking spring preloaded in the locked position of the locking piston and, when the control pressure falls below a certain value, the locking piston is movable into the unlocked position by force of the unlocking spring.

13. The hydraulic system according to claim 12, comprising a connecting channel formed in the closing piston between the end of locking piston bore turned away from the control pressure chamber and a supply pressure chamber, such that the end the locking piston turned away from the control pressure chamber is subjected to supply pressure and the locking piston is movable into the unlocked position when a sum of forces acting on the locking piston from the supply pressure and the unlocking spring exceeds an opposing force of the control pressure.

14. The hydraulic system according to claim 13, comprising a pressure spring arranged in the supply pressure chamber between the closing piston and the valve housing and preloaded at the closed position of the closing piston so as to displace the closing piston into the open position when the control pressure corresponds to ambient pressure.

15. An automatic transmission, comprising
the hydraulic system according to claim 4;
a clutch hub and a shaft, wherein the clutch hub is arranged radially outside and concentric to the closing piston and the shaft is arranged radially inside and concentric to the closing piston.

16. A method for operating a hydraulic system of an automatic transmission with the stop valve according to claim 1,
wherein for closing the corresponding clutch, the method comprises: initially raising the supply pressure to a transfer pressure value of the desired clutch pressure at which the clutch is closed;
after reaching the transfer pressure value, raising the control pressure from zero or a low pre-filling pressure to a resealing pressure value that is greater than the transfer pressure value so that the closure device is movable into the closed position against the supply pressure;
after closing of the clutch, lowering control pressure to a locking pressure value that is sufficient to hold the locking device in the locked position such that the closure device remains in the closed position and the clutch remains closed;
wherein to open the clutch, the method further comprises:
reducing the control pressure starting from the locking pressure value to the extent that the locking device, at least due to the force of an unlocking spring, is shifted into the unlocked position, and the closure device is shifted by the force of a compression spring and trapped clutch pressure into the open position.

* * * * *